United States Patent
Dähler

[19]
[11] Patent Number: 5,926,382
[45] Date of Patent: Jul. 20, 1999

[54] POWER ELECTRONIC CIRCUIT ARRANGEMENT

[75] Inventor: Peter Dähler, Remingen, Switzerland

[73] Assignee: Asea Brown Boveri AG, Baden, Switzerland

[21] Appl. No.: 08/965,863

[22] Filed: Nov. 7, 1997

[30] Foreign Application Priority Data

Nov. 20, 1996 [DE] Germany .......................... 196 47 933

[51] Int. Cl.⁶ .................................................. H02M 5/45
[52] U.S. Cl. ............................................... 363/37; 363/39
[58] Field of Search .............................. 363/34, 35, 36, 363/37, 39

[56] References Cited

U.S. PATENT DOCUMENTS

| | | | |
|---|---|---|---|
| 4,800,481 | 1/1989 | Knaffl et al. .............................. | 363/37 |
| 4,849,950 | 7/1989 | Sugiura et al. ........................... | 363/37 |
| 5,260,862 | 11/1993 | Marsh ..................................... | 363/39 |
| 5,523,937 | 6/1996 | Kahkipuro ................................ | 363/37 |

FOREIGN PATENT DOCUMENTS

| | | |
|---|---|---|
| 0212172A1 | 3/1987 | European Pat. Off. . |
| 0581322A2 | 2/1994 | European Pat. Off. . |
| 91 11 924 U | 1/1992 | Germany . |
| 4225269A1 | 2/1994 | Germany . |
| 9408504U1 | 11/1995 | Germany . |

OTHER PUBLICATIONS

"Vollstatische 100–MW–Frequenzkupplung Bremen", Boeck, et al., ABB Technik 9/10, 1996, pp. 4–17.

"Statische Bahnstromumrichter–Systemubersicht ausgefuhrter Anlagen", Lonard, et al., Elecktrische Bahnen 93, 1995, pp. 179–193.

"Leistungsstarke statische Frequenzumrichter fur den Bahnverkehr durch die Alpen", Gaupp, et al., ABB Technik 5, 1955, pp. 4–10.

Primary Examiner—Stuart N. Hecker
Attorney, Agent, or Firm—Burns, Doane, Swecker & Mathis, L.L.P.

[57] ABSTRACT

A power electronic circuit arrangement is specified, having a first power converter, which is connected to a first supply system, and a second power converter, which is connected to a second supply system. The first and second power converters are connected via a voltage intermediate circuit. According to the invention, a further filter is provided in addition to the so-called 33 Hz filter (supply-system filter) in the voltage intermediate circuit, which further filter serves to suppress the undesirable in-antiphase and in-phase current components flowing in the intermediate circuit. The additional filter can be realized either in split fashion, i.e. with two subfilters, in each case one for the in-antiphase current components and one for the in-phase current components, or in combined fashion with a common filter for both current components. The further filter, in combined or split fashion, fundamentally has a structure with a series circuit formed by a filter capacitor and a filter inductor, a filter resistor being connected in parallel with the filter inductor.

6 Claims, 1 Drawing Sheet

POWER ELECTRONIC CIRCUIT ARRANGEMENT

BACKGROUND OF THE INVENTION

1. Field of the Invention

The invention relates to the field of power electronics. It is based on a power electronic circuit arrangement, in particular a static railway power converter.

2. Discussion of Background

Such a circuit arrangement has already been described on pages 4–10 of the journal "ABB Technik" No. 5/1995. This concerns a static frequency converter installation for railway power supply. It comprises a first power converter, in particular a thyristor power converter, which is connected to a first voltage supply system and is connected to a voltage intermediate circuit. A second power converter, in particular a GTO power converter, is connected to the voltage intermediate circuit and feeds a second voltage supply system (e.g. the railway grid). The second power converter has a two-point invertor structure with a positive terminal, a negative terminal and a neutral terminal. In the voltage intermediate circuit, a first filter for taking up the doubled supply-system frequency of the second voltage supply system is provided ("33⅓ Hz filter" at a railway frequency of 16⅔ Hz).

The use of the otherwise advantageous threepoint circuit results in undesirable in-phase currents of relatively high frequency in the intermediate circuit, and interfering in-antiphase and in-phase current components occur in the intermediate circuit. These undesirable components result in distortion of the voltage characteristic. It would be possible to counteract these instances of distortion e.g. by enlarging the capacitor bank of the voltage intermediate circuit. In the event of a short circuit, however, such a high energy would be stored in the capacitor bank, which would be discharged in an extremely short time via the components, that instances of destruction would have to be expected. It is therefore desirable not to have any excessively large capacitance in the intermediate circuit.

SUMMARY OF THE INVENTION

Accordingly, one object of the invention is to provide a novel power electronic circuit arrangement, in such a way that the undesirable harmonic in-antiphase and in-phase current components are as far as possible suppressed without having to make the capacitor bank too large. This object is achieved, for a power electronic circuit arrangement of the type mentioned in the introduction, by means of the features of the present invention.

The core of the invention, then, is that a further filter is provided in addition to the so-called 33 Hz filter (supply-system filter) in the voltage intermediate circuit, which further filter serves for minimum-impedance take-up of the undesirable in-antiphase and in-phase current components flowing in the intermediate circuit. The additional filter can be realized either in split fashion, i.e. with two subfilters, in each case one for the in-phase current components and one for the in-antiphase current components, or in combined fashion with a common filter for both current components. The further filter, in combined or split fashion, fundamentally has a structure with a series circuit formed by a filter capacitor and a filter inductor, a filter resistor being connected in parallel with the filter inductor.

The combined variant is characterized by the use of a drainage coil with a center tap. The drainage coil acts only with its leakage inductances for in-phase current components in the positive path and in the negative path, which, after all, have to be closed via the neutral terminal. Accordingly, the filter inductance is predominant. The total inductance is consequently smaller than for in-antiphase currents, which are closed via the filter path and see the total drainage coil inductance. The resonant frequencies of the combined filter are therefore different for in-antiphase and in-phase current components. This automatically takes account of the different spectra of the in-phase and in-antiphase current components. By combining both filters, it is consequently possible once again to save capacitance, which is very advantageous with regard to the problems outlined in the introduction and, moreover, reduces the costs.

The particular advantage of the structure according to the invention is that the interfering in-antiphase and in-phase current components in the intermediate circuit can be suppressed without having to increase the capacitance of the capacitor bank to an excessively great extent. As a result, a circuit arrangement is achieved which is economical and is reliably controlled even in the event of a fault.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
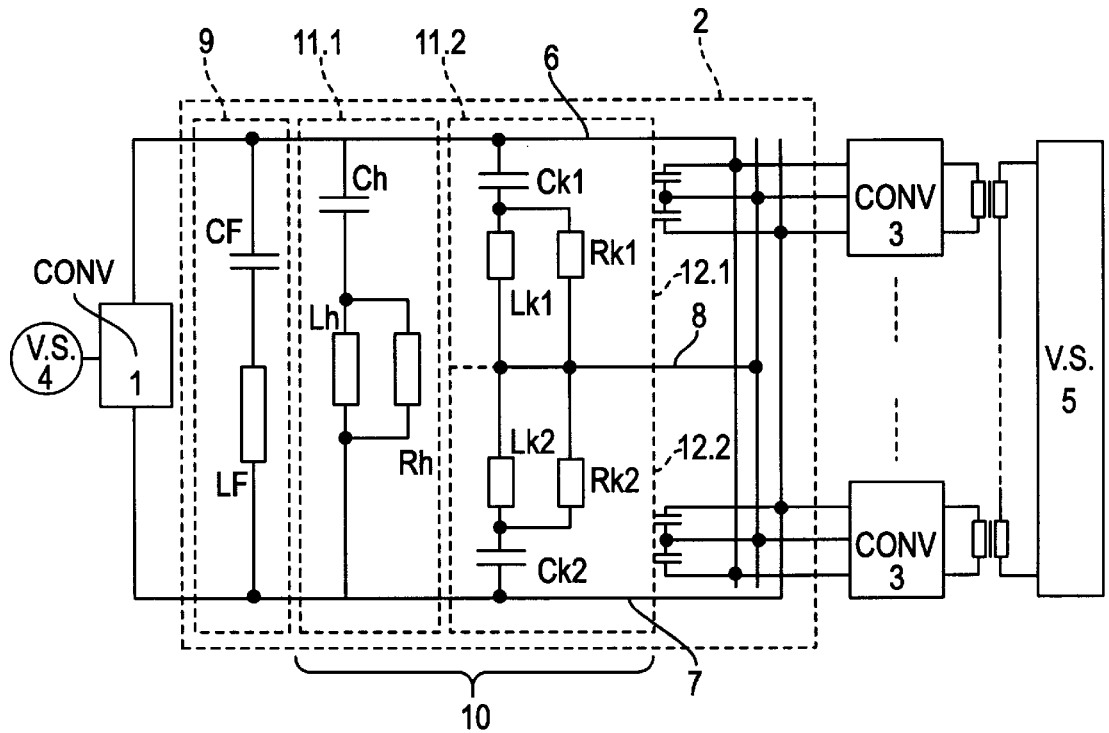
FIG. 1 shows a first exemplary embodiment of the invention.

The reference numerals used in the drawings and their meanings are summarized in the List of Designations.

DESCRIPTION OF THE PREFERRED EMBODIMENTS

Referring now to the drawings, wherein like reference numerals designate identical or corresponding parts throughout the several views, FIG. 1 shows a first exemplary embodiment of the invention. 4 designates a first voltage supply system, which is connected to a first power convertor 1. The first power convertor 1 is preferably a thyristor power converter which is connected to a three-phase voltage supply system 4. The first power converter 1 converts the three-phase voltage of the supply system 4 into a DC voltage forming a voltage intermediate circuit 2. A second power converter 3, preferably a power converter comprising a plurality of GTO converters, is connected to the voltage intermediate circuit 2. Said converter has the structure of a three-point invertor. Therefore, a neutral terminal 8 is additionally provided as well as the positive and negative terminals 6 and 7, respectively, in the intermediate circuit. The power converter 3 converts the DC voltage of the intermediate circuit into an AC voltage of a second voltage supply system 5. The first voltage supply system 1 may, for example, be the electricity supply system of a country, and the second voltage supply system 5 may, for example, be a single-phase railway grid.

A supply-system filter 9, formed by the capacitor $C_F$ and the inductor $L_F$, is provided in the intermediate circuit 2. Specifically, as a consequence of the single-phase nature of the second supply system 5, a power oscillation at twice the supply-system frequency of the second supply system 5 occurs. Since these oscillations should be kept as far removed as possible from the first supply system 4, it is necessary to provide a filter ($C_F$, $L_F$) tuned to the doubled supply-system frequency in the intermediate circuit. The power rating of this filter results from the tolerable ripple of the DC voltage at the maximum frequency deviation of the second supply system and the worst-case mistuning of the filter. Such supply-system filters belong to the prior art and are also disclosed e.g. by the article mentioned in the introduction.

The use of the three-point circuit for the second power converter 3 results in undesirable in-phase currents in the intermediate circuit 2: the currents flowing in the positive and negative terminals 6 and 7, respectively, may be regarded as a superposition of in-phase (common-mode) and in-antiphase (differential-mode) components. The in-phase components are particularly undesirable since they can be closed only via the neutral terminal 8 of the power converter 3 and transfer the charges of the capacitors asymmetrically over the intermediate circuit halves.

A spectral analysis of the in-antiphase and in-phase currents assuming an ideal, sinusoidal supply-system voltage of the supply system 5 reveals that the in-phase components have larger amplitudes than the in-antiphase components and that they are centered around a lower center frequency than the in-antiphase components. The in-antiphase components have a smaller amplitude than the in-phase components and are centered around a center frequency which corresponds approximately to twice the center frequency of the in-phase components.

The power converter 3 and its control procedure are regarded as being the cause of the in-phase and in-antiphase current components of the previously described type. Additional in-antiphase components are caused by the interactions between DC voltage intermediate circuit 10, power converter 3 and supply system 5. Such harmonics are generated in particular by instances of distortion of the voltage of the supply system 5. The single desirable differential component is that having the ordinal number 0, i.e. direct current. All other components have an interfering effect on the operation of the circuit arrangement. A design of the power converter 3 as a three-point or two-point circuit has no influence on the in-antiphase components, rather only on the in-phase components.

In order to suppress the effects of the undesirable harmonic in-phase or in-antiphase current components in the intermediate circuit, according to the invention a special filter is connected into the intermediate circuit. FIG. 1 shows a first exemplary embodiment of the filter according to the invention. It comprises two subfilters 11.1 and 11.2. The subfilter for the in-antiphase current components comprises a series circuit formed by a filter capacitor $C_h$ and a filter inductor $L_h$, a filter resistor $R_h$ being connected in parallel with the filter inductor. The series circuit is arranged between the positive terminal 6 and the negative terminal 7. The subfilter 11.1 is tuned in such a way that it generates a low impedance for in-antiphase current components up to approximately 100 Hz in the case of a supply-system frequency of 50 Hz for the first supply system and a supply-system of 16.67 Hz for the second supply system. This minimizes undesirable effects of harmonics of the order n=3 and n=5 in the voltage of the supply system The second subfilter 11.2 is provided for the in-phase current components and comprises two half-filters 12.1 and 12.2, which are arranged between the positive terminal 6 and the neutral terminal 8, on the one hand, and between the negative terminal 7 and the neutral terminal 8, on the other hand. Both half-filters comprise a series circuit formed by a capacitor $C_k$ and an inductor $L_k$, it being possible to provide a resistor $R_k$ in parallel with the inductor. The filters 12.1 and 12.2 are tuned in such a way that they generate a low impedance for in-phase current components up to approximately 300 Hz in the case of a supply-system frequency of 50 Hz for the first supply system 4 and a supply-system frequency of 16.67 Hz for the second supply system 5. This numerical example is practical for power converters 3 which are constructed from four 3-point invertors connected in parallel.

Such an additional filter 10 enables the interfering influence of the in-phase and in-antiphase components to be effectively reduced. An even more compact structure is achieved by combining the two subfilters 11.1 and 11.2. This is done with a circuit arrangement according to FIG. 2.

Figure 2:
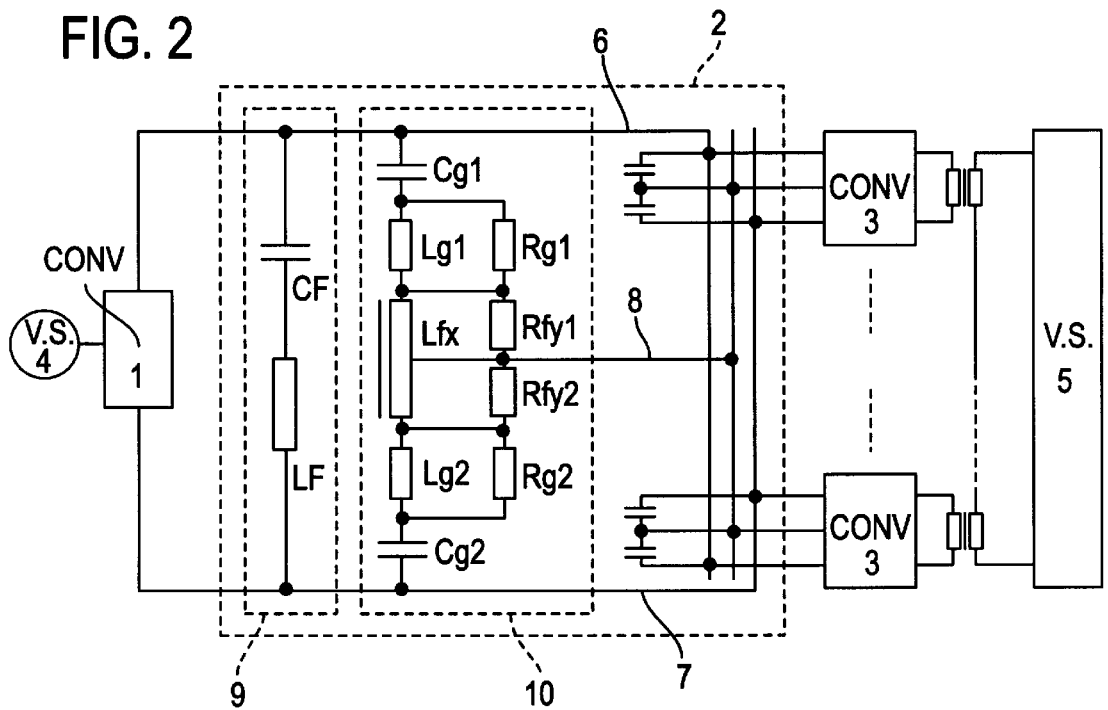
FIG. 2 shows a second exemplary embodiment of the invention.

The combined filter according to FIG. 2 comprises a series circuit formed by a filter capacitor $C_{g1}$, $C_{g2}$, a filter inductor $L_{g1}$, $L_{g2}$ and a drainage coil $L_{fx}$, which series circuit is symmetrical with regard to the neutral terminal 8. Resistors $R_{g1}$, $R_{g2}$ and $R_{fy1}$, $R_{fy2}$ are respectively connected in parallel with the inductors. The drainage coil is equipped with a center tap, which is connected to the neutral terminal 8 of the intermediate circuit 2. The drainage coil $L_{fx}$ preferably has a structure with a ferromagnetic core. In-phase current components, i.e. those which have to be closed via the neutral terminal 8, see only the leakage inductances of the drainage coil $L_{fx}$, on account of the properties of the latter, whereas in-antiphase current components, i.e. those flowing via the filter, see the total inductance of the drainage coil. In the case of in-phase currents, the total inductance of the filter is consequently smaller than that for in-antiphase currents. This results in a lower resonant frequency of the filter for in-antiphase components than for in-phase components. In this way, it is possible to unite a combined filter having a different effect for in-antiphase and in-phase current components in a single filter.

In the case of a first supply-system frequency of 50 Hz and a second supply-system frequency of 16.67 Hz, an inductance $L_{fx}$=0.987 mH and resistances $R_{fy1,2}$=0.54Ω result, given capacitances of 7.8 mF for the capacitors $C_{g1,2}$. A value of 20.3 $\mu$H results for the inductance $L_{g1,2}$ and a value of 102 mΩ results for $R_{g1,2}$. This numerical example is practical for power converters 3 which are constructed from four 3-point invertors connected in parallel.

The circuit arrangement according to the invention therefore enables the undesirable influence of the in-antiphase and in-phase harmonic current components in the intermediate circuit to be effectively reduced without the intermediate circuit capacitance having to be excessively greatly increased.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power electronic circuit arrangement comprising:
   (a) at least one first power converter which is connected to a first voltage supply system and is connected to a voltage intermediate circuit;
   (b) at least one second power converter which is connected to the voltage intermediate circuit and feeds a second voltage supply system, the second power converter having a three-point invertor structure and being connected to a positive, a negative and a neutral terminal of the intermediate circuit;

(c) a supply-system filter for taking up a doubled supply-system frequency of the second voltage supply in the voltage intermediate circuit; and (d) a further filter in the voltage intermediate circuit, which filter is designed to suppress effects both of in-phase harmonic and of in-antiphase harmonic current components flowing in the voltage intermediate circuit.

2. The circuit arrangement as claimed in claim 1, wherein the further filter comprises:

a first subfilter for suppressing in-antiphase current components and a second subfilter for suppressing in-phase current components, the first subfilter comprising a series circuit formed by a filter capacitor and a filter inductor, with which a filter resistor is connected in parallel, and being arranged between the positive and negative terminals of the voltage intermediate circuit.

3. The circuit arrangement as claimed in claim 2, wherein the second subfilter comprises first and second half-filters each having a series circuit formed by a filter capacitor and a filter inductor, with which a filter resister is connected in parallel, and wherein the first half-filter is arranged between the positive terminal and the neutral terminal and the second half-filter is arranged between the negative terminal and the neutral terminal.

4. The circuit arrangement as claimed in claim 1, wherein the further filter comprises:

a series circuit formed by a first filter capacitor, a first filter inductor, a drainage coil with a center tap, a second filter inductor, and a second filter capacitor which series circuit is connected between the positive and negative terminals, the center tap of the drainage coil being connected to the neutral terminal, and a first and second filter resister being respectively connected in parallel with the first and second filter inductors, and a further resistor being connected between the neutral terminal and the terminals of drainage coil.

5. The circuit arrangement as claimed in claim 1, wherein said at least one first power converter is a thyrister power converter, and said second power converter is a GTO converter.

6. The circuit arrangement as claimed in claim 1, wherein said power electronic circuit arrangement is a static railway power converter.

* * * * *